United States Patent
Khanna et al.

(10) Patent No.: US 6,438,593 B1
(45) Date of Patent: Aug. 20, 2002

(54) METHOD FOR INFORMATION RETRIEVAL IN BROADCAST DISK SYSTEMS

(75) Inventors: Sanjeev Khanna, Highland Park; Vincenzo Liberatore, Somerset, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/082,786

(22) Filed: May 21, 1998

(51) Int. Cl.<sup>7</sup> ............................................... G06F 13/00
(52) U.S. Cl. ........................................ 709/224; 709/203
(58) Field of Search ................................ 709/212, 213, 709/214, 216, 200, 201, 223, 224, 203, 217, 218, 219, 229; 711/137, 136; 725/94, 115, 145; 348/461, 468

(56) References Cited

U.S. PATENT DOCUMENTS

| | | | |
|---|---|---|---|
| 5,353,064 A | * 10/1994 | Schlink | 348/468 |
| 5,577,224 A | * 11/1996 | DeWitt et al. | 395/445 |
| 5,611,049 A | * 3/1997 | Pitts | 395/200.09 |
| 5,614,940 A | * 3/1997 | Cobbley et al. | 725/138 |
| 5,713,003 A | * 1/1998 | DeWitt et al. | 395/445 |
| 5,758,257 A | * 5/1998 | Herz et al. | 455/2 |
| 5,801,753 A | * 9/1998 | Eyer et al. | 348/13 |
| 5,815,662 A | * 9/1998 | Ong | 709/217 |
| 5,818,510 A | * 10/1998 | Cobbley et al. | 725/139 |
| 5,842,010 A | * 11/1998 | Jain et al. | 707/104 |
| 5,870,551 A | * 2/1999 | Ozden et al. | 709/219 |
| 5,896,506 A | * 4/1999 | Ali et al. | 395/200.43 |
| 5,920,700 A | * 7/1999 | Gordon et al. | 348/7 |
| 5,924,116 A | * 7/1999 | Aggarwal et al. | 711/122 |
| 5,929,850 A | * 7/1999 | Broadwin et al. | 345/327 |
| 5,978,841 A | * 11/1999 | Berger | 709/217 |
| 6,016,520 A | * 1/2000 | Facq et al. | 710/33 |
| 6,049,850 A | * 4/2000 | Vishlitzky et al. | 711/136 |
| 6,098,096 A | * 8/2000 | Tsirigotis et al. | 709/213 |

OTHER PUBLICATIONS

Acharya et al. "Dissemination–based data Delivery Using Broadcast Disks". IEEE Online. Dec. 1995 pp. 50–60.*

* cited by examiner

Primary Examiner—Moustafa M. Meky
(74) Attorney, Agent, or Firm—DeMont & Breyer, LL; Wayne S. Breyer; Jason Paul DeMont

(57) ABSTRACT

A paging method for information retrieval from broadcast disk systems is described. In response to a page request (e.g., a request for an item of data), the method selectively stores and evicts, in and from a fast memory, pages of data broadcasted by the broadcast disk system. The methods proceeds using a three-"color" labelling scheme, wherein the label assigned to a broadcasted page is based on how recently a given page was last requested. If a requested page is stored in fast memory, then the request is immediately served. If the requested page is not stored in fast memory, the request cannot be served until the requested page is broadcasted. While waiting for the requested page to be broadcasted, certain "somewhat-recently" requested pages are "prefetched," wherein they are stored in fast memory even though there is no pending request for such pages. Since the size of the fast memory is very small compared to the amount of information being broadcasted, only a small amount of the available information can be stored and there will be significant turnover in the particular stored pages as a function of the page requests. Pages are selected for eviction based upon the "cost" (to the competitive performance of the method) to replace the evicted page, wherein the least costly page to replace is evicted. The present method achieves a bounded competitive ratio of O (n log k), where n is the number of pages being broadcasted and k is the size of the fast memory.

13 Claims, 3 Drawing Sheets

METHOD FOR INFORMATION RETRIEVAL IN BROADCAST DISK SYSTEMS

FIELD OF THE INVENTION

The present invention is related to data broadcasting. More particularly, the present invention relates to an improved method for information retrieval from broadcast disk systems.

BACKGROUND OF THE INVENTION

In traditional client-server architectures, such as the World Wide Web, data transfers are initiated by the clients. Such an architecture is referred to as a "pull" system because clients, by their requests, "pull" data from the server. An emerging alternative to pull systems are "push" systems. In push systems, the server repeatedly broadcasts or "pushes" data towards clients even though there is no request on the part of the clients for such data.

One type of push technology is referred to as a "broadcast disk system." In broadcast disk systems, data is divided into a number of equal-sized pages. Such pages are broadcast in a round-robin manner by a server. The name "broadcast disk" derives from the broadcast schedule, which is a circular repetition of the pages. Broadcast disk systems have been in use since the early 1980s by many national television companies in Western Europe. Moreover, broadcast disks have also been used in high-throughput multiprocessor database systems over high-bandwidth networks and wireless telecommunications systems. Typical of push systems, broadcast disk systems are particularly useful for disseminating massive amounts of information to a large number of clients.

FIG. 1 depicts, figuratively, a broadcast disk system that is implemented using wireless telecommunications technology. It should be understood that a broadcast disk system may alternatively be implemented as a wireline system. The broadcast disk system comprises server 102 including appropriate radios and processors (not shown) for broadcasting information or data items on pages $P_1-P_n$ in a broadcast cycle 104. The pages of data items are broadcast by antenna 106 to a plurality of clients, four of which clients, $C_1-C_4$, are shown in FIG. 1. The clients receive each particular page at substantially the same time.

Since the pages are broadcast according to a set schedule unrelated to a particular client's need for a specific item of information, a client may disadvantageously have to wait a long time for desired information to be broadcast. Such a scenario is illustrated with reference to FIG. 1, which depicts server 102 broadcasting page $P_j$ at time $T_1$. For the purpose of the present example, it is assumed that client $C_1$ requires, at time $T_1$, a data item that is located on page $P_i$. It is evident from the illustration that client $C_1$ will have to wait the better part of a broadcast cycle until page $P_i$ is again broadcast.

To improve the performance (i.e., decrease the waiting time) of broadcast disk systems, client storage resources are advantageously integrated with the broadcast disk system. In particular, such storage resources allow a client to store at least some of the broadcasted pages in a local fast memory. If a page desired by the client turns out to be stored in such fast memory, such a page request can be satisfied immediately. For example, if client $C_1$ possessed such storage capabilities, and has page $P_i$ stored in its fast memory at time $T_1$, the page request for page $P_i$ will be immediately satisfied.

It will be appreciated that the storage capacity of a client's fast memory is typically insufficient for storing all information broadcast by the broadcast disk system. As such, pages must be selectively stored. The contents of a client's fast memory typically changes on a substantially regular basis as a client adds pages to the fast memory and evicts others to make room for the added pages. Returning to the example, if client $C_1$ chooses not to store page $P_i$ in its fast memory, or, if page $P_i$ is stored but the client decides to evict it before time $T_1$, then the client will have to wait for page $P_i$ to be broadcast again by the server, thereby incurring a "cost."

The aforementioned technique wherein client storage resources are used for storing broadcasted pages is referred to as "paging." A broadcast disk system incorporating paging is referred to as broadcast disk paging (BDP) system. A client's objective is to reduce, to a practical minimum, the time (i.e., cost) needed to satisfy a sequence of page requests.

The prior art has utilized a paging method referred to as "least recently used" ("LRU") to improve broadcast disk system performance. In the LRU method, as a page is requested it is time-stamped. The time stamp is continually updated to reflect the most recent request for each particular page. When a page fault occurs (i.e., a requested page is not in fast memory), the least recently requested page is evicted from fast memory and the requested page, once broadcast, is added thereto.

The cost, A, for a paging method can be evaluated relative to the cost, C, of an optimal paging method. In an optimal paging method, the schedule of page requests is known Thus, pages can be stored and evicted in fast memory in an "optimum" manner. The LRU method achieves a relatively poor competitive ratio, A/C, of O (n·k), where n is the number of pages being broadcast, k is the size of the fast memory and the notation "O," referred to as "big O," or "on the order of," is a conventional notation defined for use herein as follows: a function $f(x)$ is said to be "O (g (x))" is there exists a constant, c, such that for every x, $f(x) \leq c \cdot g(x)$.

In view of the poor competitive ratio achieved by the aforementioned prior art paging method, the art would benefit from a new paging method having improved competitive performance.

SUMMARY OF THE INVENTION

A paging method for information retrieval from broadcast disk systems is described. In some embodiments, the present method advantageously achieves a competitive ratio of O (n log k), which is significantly better than that of the prior art LRU methods. The method proceeds in response to a page request (e.g., a request for an item of data, which request originates from a program operating on a processor). To satisfy the request in an efficient manner, a three- "color" labelling scheme is advantageously used, wherein:

(1) Fast memory is checked for the requested page.
(2) If the requested page is present in the fast memory, the request is considered to be immediately fulfilled.

If the requested page is not present in the fast memory, and (A) if the requested page is not presently being broadcasted, and
   (i) if the page being broadcasted is "grey," indicating that it has "somewhat recently" been requested, then the grey page is stored in fast memory;
   (ii) if the page being broadcasted is "white," indicating that is has not been requested in some time, then the page is not added to fast memory.
(B) if the requested page is presently being broadcasted, it is re-labelled as "black" and added to fast memory.

As a black- or grey-labelled page is added to fast memory, the grey-labelled page that is "least expensive" to reload into fast memory is evicted therefrom to make room for the added page, as required.

(3) When fast memory is filled with black-labelled pages, all grey-labelled pages (none of which will be in fast memory) are re-labelled as "white" to indicate that they have not been requested in quite some time, and all black-labelled pages are relabelled as "grey" indicating that they have recently been requested. The method then repeats, adding and evicting pages as appropriate.

The operation wherein "grey" (i. e., non-requested) pages are added to fast memory while waiting for the requested page to be broadcasted is referred to herein as "prefetching." Prefetching in accordance with the present teachings advantageously adds a "highest-cost" page to fast memory. By way of explanation, each non-requested page, at the completion of its broadcast, is a "highest-cost" page because it will take a complete broadcast cycle until that page is rebroadcasted. In accordance with the present teachings, if such a "highest-cost" page is a grey-labelled page indicating that is has recently been requested, it is advantageously added to fast memory since, in accordance with the present method, a grey-labelled page is more likely to be requested than a white-labelled page. If a page is requested immediately after it is broadcast, and such a page is not present in fast memory, the highest possible cost (longest wait for re-broadcasting) is incurred.

Assuming that the fast memory is full, a page must be evicted to allow a page to be added thereto. In accordance with the present teachings, the grey-labelled page in fast memory that is the least expensive to replace (of all such stored, grey-labelled pages) is advantageously evicted from fast memory. The least expensive page to replace is the page that, according to the broadcast schedule, will be re-broadcast first. Thus, if that page is requested immediately after its eviction from fast memory, a lower cost is incurred in waiting for that page to be rebroadcast as compared to grey-labelled pages in fast memory.

By virtue of the three-"color" labelling scheme and prefetching operation, the present method takes into account the relative expense or cost of pages, unlike the LRU method of the prior art. By doing so, the present method achieves a significantly better competitive ratio than the prior art.

It will be understood that the label designations used herein (i.e., black, grey and white), are arbitrarily chosen. Any labelling scheme may be used.

DETAILED DESCRIPTION

The illustrative embodiment of a broadcast disk paging system depicted in the accompanying drawings and described herein can be implemented over wireless or wireline telecommunications systems. For both such applications, a server (e.g., a base station, etc.) broadcasts information over a communications channel supported by a communications medium (e.g., air, wire, optical waveguides, etc.) to a multiplicity of clients (e.g., a wireless terminal, such as, for example, a lap-top computer operable to receive broadcast information, or a wireline terminal).

For clarity of explanation, a method in accordance with an illustrative embodiment of the present invention is presented as a collection of individual functional blocks. The functions these blocks represent may be provided using either shared or dedicated hardware, including, without limitation, hardware capable of executing software. Illustrative embodiments of such software-executing hardware comprise an appropriately-programmed general purpose processor or hardwired special-purpose processor, read-only memory (ROM) for storing software performing the operations described herein and random-access memory (RAM) for storing processor results and cache memory for storing broadcast information.

Figure 1:
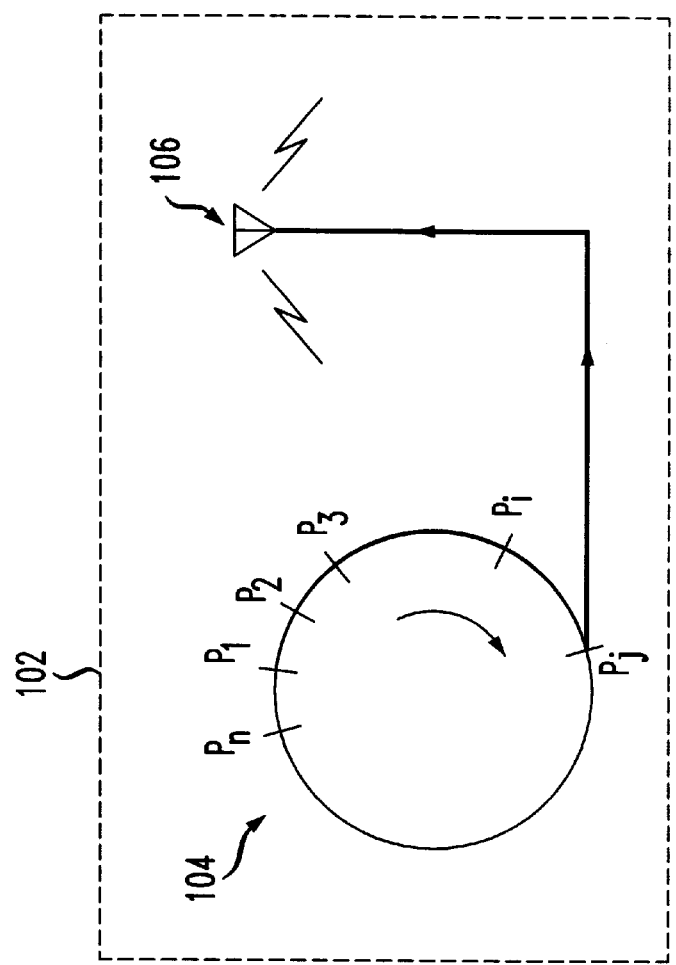
FIG. 1 depicts a figurative representation of a conventional broadcast disk system.
Figure 1:
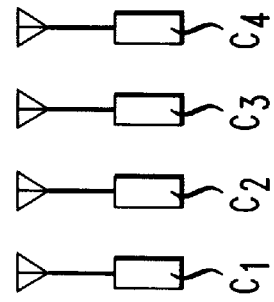
Figure 2:
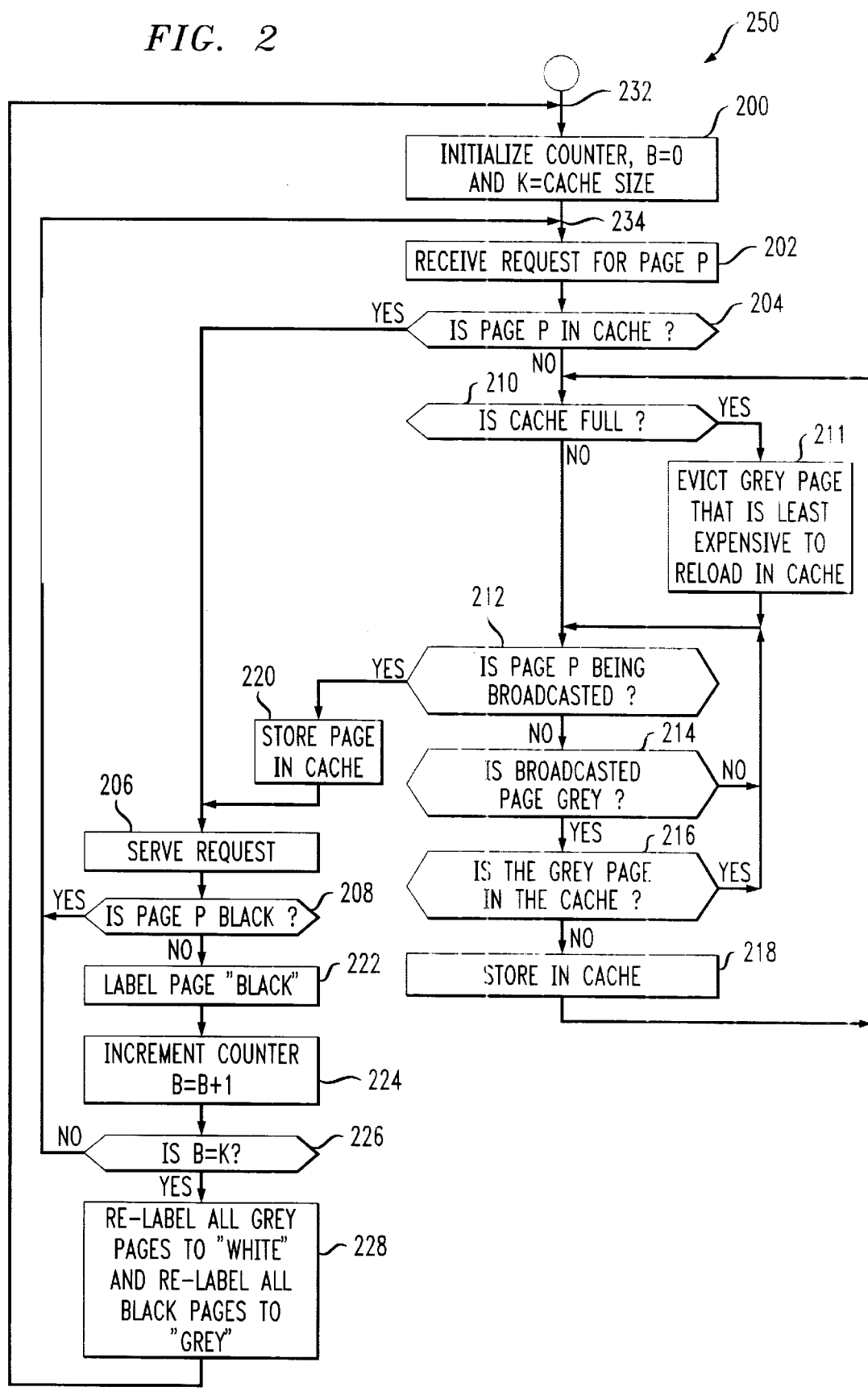
FIG. 2 depicts a flow chart of paging method in accordance with an illustrated embodiment of the present invention.

FIG. 2 depicts a flowchart of a paging method 250 for information retrieval from broadcast disk systems in accordance with the illustrative embodiment of the present invention. In one embodiment, method 250 is implemented by expressing the functional blocks shown in FIG. 2 as a computer-readable language, and storing it on the hard drive of a processor, such as a lap-top computer. The computer further includes a receiver for receiving wireless data transmissions or a modem for receiving wireline transmissions from a broadcast disk system.

Additionally, the computer includes "fast memory" or "cache memory," which terms are used interchangeably herein, for storing information received from the broadcast disk system. As used herein, the phrases "fast" or "cache" memory refer to memory that is typically quite small, ranging in size from a few kilobytes (K) up to about 512 K. Such memory is, in comparison with random access memory (RAM) or a hard drive, more properly termed "ultra-fast." Such fast or cache memory includes, for example, cache memory that is built directly into the microprocessor circuitry, so called "L1" or "primary" cache, as well as cache memory that is contained on an external circuit, so called "L2" or "secondary" cache.

The present method is used in conjunction with, for example, an applications program running on the processor that requires data that is available from the broadcast disk system. The paging method 250 can thus be used for efficient information retrieval from the broadcast disk system for the benefit of the applications program. Such data is broadcast, by the broadcast disk system, in the form of "pages." For simplicity, the processing operations of the present method are described to operate (e.g., store, evict, serve, etc.) on "pages." It should be understood that when the present method is implemented as a computer-readable software program, such processing is typically performed on electrical signals indicative of information stored on such pages.

Turning now to method 250, a counter is initialized in operation 200. In operation 202, a page request is received. The lowest cost manner in which to satisfy the page request is to retrieve the page from a fast memory, if the requested page is stored therein. As such, in operation 204, cache memory is checked to see if the requested page is stored therein. If the requested page is stored in cache memory, the request is served (in zero time) per operation 206. After serving the request, it is determined, in operation 208, if the requested page is black-labelled. If the page is black-labelled, no action is taken, and processing loops back to location 234 to process the next page request (which is assumed to follow without delay). If the page is grey-labelled, then it is re-labelled as "black" in operation 222.

Next, in step 224, counter B is incremented to reflect the addition of a black-labelled page to cache memory. If cache memory is full of black-labelled pages (decision operation 226), a cycle of the method is complete. All grey-labelled pages are re4abelled as white and all black-labelled pages are re-labelled grey in operation 228, and processing loops back to location 232, wherein a second cycle or phase starts by initializing the counter in operation 200.

If the requested page is not stored in cache memory, it must be obtained when broadcast by the broadcast disk system. To prepare for the addition of a page to cache memory, one page must be dropped therefrom, if the cache is full. Thus, if it is determined at operation 210 that the cache is full, the grey-labelled page that is least expensive to reload in cache memory is evicted therefrom according to operation 211. If the cache is not full, eviction operation 211 is bypassed.

In operation 212, it is determined whether a page currently being broadcast is the requested page. If the page is not the requested page, it is determined, in operation 214, whether the broadcasted page is a grey-labelled page. If the broadcasted page is not a grey-labelled page (i.e., it is a white-labelled page), processing loops back to decision operation 212. If the broadcasted page is a grey-labelled page, it is then determined, in operation 216, whether the grey-labelled page is in cache memory. If it is, then processing loops back to decision operation 212. If not, a prefetching operation 218 is advantageously performed wherein the currently-broadcast grey-labelled page is stored in cache memory (as a grey-labelled page). In preparation for storing the next broadcast page, processing loops back to decision operation 210 to evict a page if cache memory is full.

If it is determined that the page currently being broadcast is the requested page, then that page is stored in cache memory, as per operation 220, and served as per operation 206. Since the page can only be grey-labelled or white-labelled, the response to decision block 208 is "no" and the page is labelled "black" in operation 222. In step 224, counter B is incremented to reflect the addition of a black-labelled page to cache memory. If cache memory is full of black-labelled pages (decision operation 226), a cycle of the method is complete. All grey-labelled pages are re-labelled as white and all black-labelled pages are re-labelled grey in operation 228, and processing loops back to location 232, wherein a second cycle or phase starts by initializing the counter in operation 200.

If it is determined, at decision operation 226, that cache memory is not fall of black-labelled pages, processing loops back to location 234 to process another page request.

Figure 3:
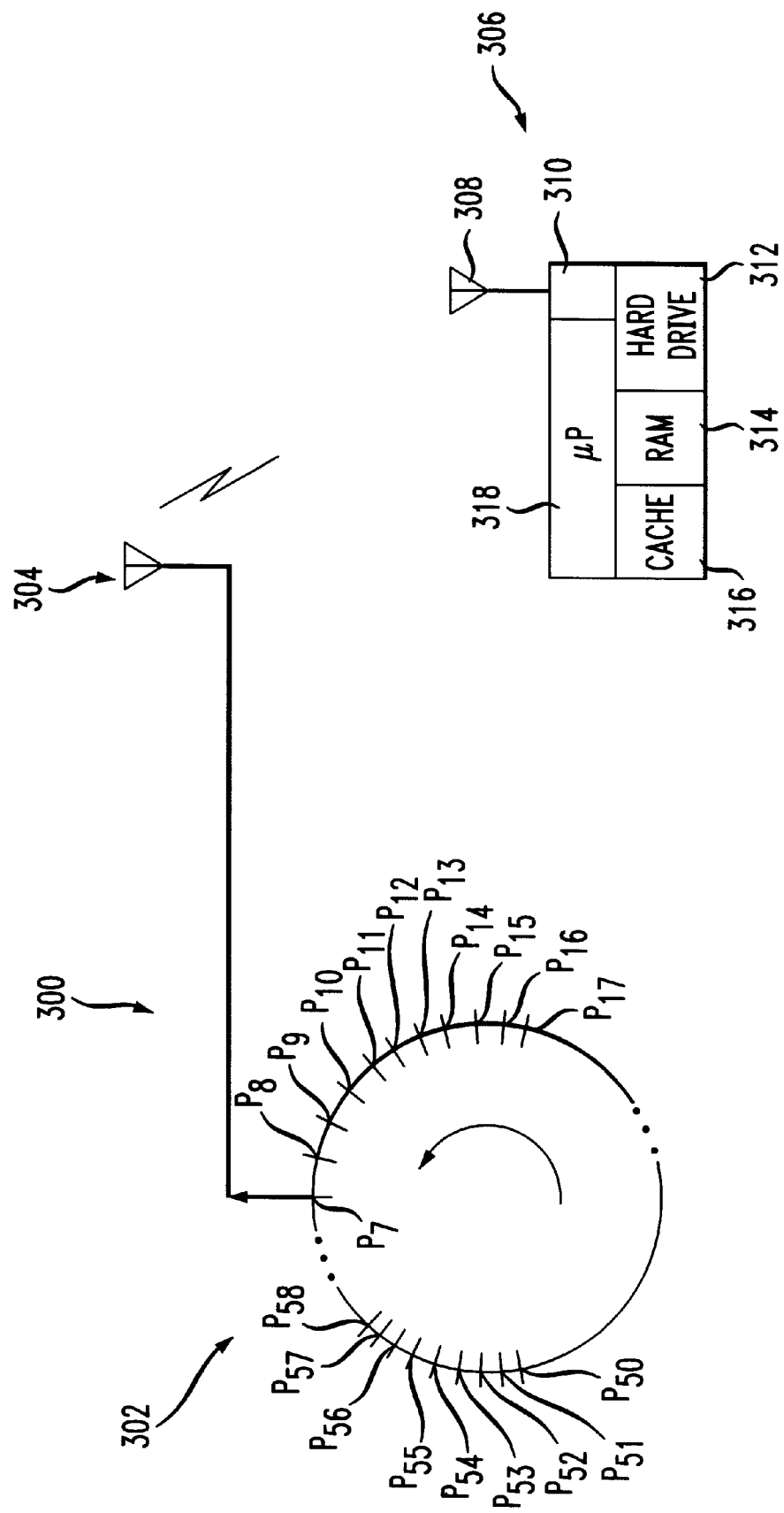
FIG. 3 depicts an illustrative example of the present paging method as used in conjunction with a broadcast disk system.

Further description of method 250 is provided by way of an Example, depicted in FIG. 3. FIG. 3 depicts, figuratively, one embodiment of a broadcast disk paging system in accordance with the illustrative embodiment of the present invention. The broadcast disk paging system depicted in FIG. 3 is implemented using wireless telecommunications technology; it should be understood that the present broadcast disk paging system may alternatively be implemented as a wireline system.

The broadcast disk system comprises server 300 including appropriate radios and processors (not shown) for broadcasting information or data items on a plurality of pages in a broadcast cycle 302. A few illustrative pages (i.e., $P_7$–$P_{17}$ and $P_{50}$–$P_{58}$) that are included in the broadcast cycle are depicted in FIG. 3. The pages of data items are sequentially broadcast by antenna 304 to a plurality of clients, one of which clients, terminal 306, is depicted in FIG. 3. In the present embodiment, terminal 306 includes antenna 308 and receiver 310 for receiving broadcasted pages from server 300.

Terminal 306 further includes a hard drive 312, RAM 314, cache memory 316 and microprocessor 318. Method 250, implemented as a program ("the method-implementing program") comprising a plurality of computer-readable commands, is stored on hard drive 312, along with an applications program requiring data contained in pages that are broadcast from server 300. In use, the method-implementing program and the applications program are typically moved to RAM. Microprocessor 318 interacts with the method-implementing program, applications program and cache memory 316 whereby broadcasted pages are selectively stored and evicted from cache memory 316 for use by the applications program. The details of the interaction between the microprocessor, various storage domains and programs and the manner in which data is moved throughout terminal 306 are known in the art and are not described herein.

For the present example, pages $P_{10}$, and $P_{50}$–$P_{57}$ are assumed to have already been labelled as "grey," pages $P_{58}$ and $P_9$ are labelled as "black," and pages $P_7$, $P_8$, and $P_{11}$–$P_{17}$ are labelled as "white."Cache memory 316 is assumed to be fill, and includes grey pages $P_{50}$–$P_{57}$ and a plurality of black pages including $P_{58}$ and $P_9$. Server 300 is broadcasting page $P_7$ at time $T_1$. At time $T_1$, the applications program makes a request for information known to be contained on page $P_{58}$. Referring to FIG. 2, the method-implementing program receives the page request at operation 202 and checks, in operation 204, if page $P_{58}$ is in cache memory 316. Page $P_{58}$ is determined to be in cache memory 316 as a black-labelled page. In accordance with operation 206, the request is served. Since the page is labelled black, the response to decision operation 208 is "yes." As such, no action is taken and processing loops back to location 234 to process the next page request.

At time $T_2$, the applications program makes a request for information known to be contained on page $P_{17}$. At time $T_2$, the applications program is, however, broadcasting $P_8$. According to method 250 (FIG. 2), cache memory 316 is checked, in operation 204, for the page $P_{17}$. It is determined that page $P_{17}$ is not stored in cache memory 316. It is further determined, as a result of decision operation 210, that cache memory 316 is full. As such, the grey-labelled page that is least expensive to reload into cache memory 316, which is page $P_{50}$, is evicted from cache memory 316 to make room for an additional page.

In decision operation 212, it is determined whether or not $P_{17}$ is currently being broadcast. Since $P_8$ is currently being broadcast, the response to decision operation 212 is "no," and processing continues at decision operation 214, wherein it is determined whether or not the page being broadcast is labelled "grey." Since, for the present example, $P_8$ is assumed to be a white-labeled page, the response to decision operation 214 is "no." Processing thus loops back to decision operation 212.

It is assumed that server 302 is now broadcasting page $P_9$, which has been assumed to be a black-labelled page. The response to decision operation 212 is therefore "no." The response to decision operation 214 is "no," since the broadcasted page is not a grey-labelled page, and processing loops back to decision operation 212. Page $P_{10}$ is assumed to be currently broadcasting. Since the requested page is page $P_{17}$, the response to decision operation 212 is "no." Since page $P_{10}$ is assumed to be a grey-labelled page, the response to decision operation 214 is "yes." Page $P_{10}$ is not in cache memory 316, so that the response to decision operation 216 is "no," and page $P_{10}$ is added to cache memory in accordance with operation 218. Processing loops back to decision operation 210.

Since page $P_{10}$ was added to cache memory 316, it is full again. Thus, in operation 211, the grey-labelled page least expensive to reload into cache memory 316, now page $P_{51}$, is evicted. Pages $P_{11}$–$P_{16}$ are sequentially broadcast by server 300 and processed in accordance with the present method. Since pages $P_{11}$–$P_{16}$ are white-labelled pages, none of which will be added to cache memory 316, each of such pages is processed in a loop that includes operation 212 (the response to which is "no") and operation 214 (the response to which is "no").

Finally, requested page $P_{17}$ is broadcast. Thus, the response to decision operation 212 is now "yes," and page $P_{17}$ is stored in cache memory 316 in accordance with operation 220, and served as per operation 206. Since page $P_{17}$ is a white-labelled page, the response to decision operation 208 is "no" and page $P_{17}$ is labelled as "black," per operation 222. Counter B is incremented in operation 224, thereby keeping track of the number of black-labelled pages in cache memory 316. Decision operation 226 queries whether cache memory 316 is full of black-labelled pages. Since several grey-labelled pages remain in cache memory 316, the response is "no." Processing loops back to location 234 to process the next page request.

It was noted earlier that the present method assumes that page requests are delivered one after the other without delay. It can be shown, however, that the performance of method 250 (i.e., O (n log k) competitive) is unchanged even if delays (e.g., computation time on the client side) are introduced.

It is to be understood that the embodiments described herein are merely illustrative of the many possible specific arrangements that can be devised in application of the principles of the invention. Other arrangements can be devised in accordance with these principles by those of ordinary skill in the art without departing from the scope and spirit of the invention. For example, while the illustrative embodiment of the present invention is implemented using three labels (i.e., black, grey and white), it should be understood that in other embodiments, only two labels are used. In such embodiments, the pages that would otherwise be designated as "white" remain unlabelled. It is therefore intended that such other arrangements be included within the scope of the following claims and their equivalents.

We claim:

1. A method for information retrieval, wherein the information is broadcast in the form of pages, comprising the steps of:
   receiving a request for a first page;
   labelling pages with first, second or third labels, wherein the first label designates pages more recently requested than the second label, and the second label designates pages more recently requested than the third label;
   storing a broadcasted page in a fast memory when said broadcasted page is the requested first page, and labelling the broadcasted page with the first label, but only if the broadcasted page is not already stored in the fast memory; and
   prefetching the broadcasted page when said broadcasted page is not the requested first page, said prefetching comprising storing said broadcasted page in the fast memory, but only if:
   (i) the broadcasted page is not already stored in the fast memory; and
   (ii) the broadcasted page is labelled with the second label.

2. The method of claim 1, and further comprising the step of serving the request if the requested first page is stored in the fast memory.

3. The method of claim 2, and further comprising the step of:
   selecting a page for eviction from the fast memory and evicting the selected page if the fast memory is full, wherein, only a page labelled with the second label is eligible for eviction.

4. The method of claim 3, wherein the selecting step comprises selecting that eligible page which would be least expensive to reload into the fast memory.

5. The method of claim 4, and further comprising the steps of:
   relabelling all pages when the fast memory is full of pages labelled with the first label, wherein,
   (i) all pages having the second label are given, instead, the third label; and
   (ii) all pages having the first label are given, instead, the second label.

6. The method of claim 2, wherein the step of serving the request further comprises the step of re-labelling the first page stored in fast memory with the first label if the stored first page has the second label.

7. The method of claim 1, wherein the step of receiving a request further comprises receiving a request for the first page from an applications software program.

8. A broadcast disk paging system, comprising:
   a server operable to broadcast information organized into a plurality of equal-sized pages, and
   a client operable to receive the broadcasted pages of information, the client comprising:
   means for receiving the broadcasted pages;
   a fast memory;
   selecting means for selecting pages to store in the fast memory in response to a request for a first page, said selecting means operable to:
   (i) label pages with at least first or second labels, the first label designating pages more recently requested than the second label; and
   (ii) prefetch a page labelled with the second label when said page is being broadcast, but only if said page is not the first requested page and said page is not stored in the fast memory.

9. The broadcast disk paging system of claim 8, wherein the server comprises a base station operable to broadcast the pages of information via an antenna, and means for receiving the broadcasted pages comprises an antenna and a receiver.

10. The broadcast disk paging system of claim 8, wherein the client further comprises an applications program that originates the page request.

11. The broadcast disk paging system of claim 8, wherein the client comprises:

an appropriately-programmed general purpose processor;

a memory for storing the selecting means embodied as software; and the fast memory, in which broadcasted pages are stored, wherein the processor is operable to run the selecting means and store pages in the fast memory.

12. The broadcast disk paging system of claim 11, wherein the client further comprises:

an applications software program stored in the memory.

13. A computer-readable storage medium comprising encoded computer-readable program instructions for use in conjunction with a programmable computer, which instructions cause the computer to selectively store information, in response to a request for a first page of information, wherein the information is stored in a fast memory that is in communication with the programmable computer, the instructions further operable to cause the computer to:

(i) label pages with at least first or second labels, the first label designating pages more recently requested than the second label; and (ii) prefetch a page labelled with the second label when said page is being broadcast, but only if said page is not the first requested page and said page is not stored in the fast memory.

* * * * *